Patented June 23, 1942

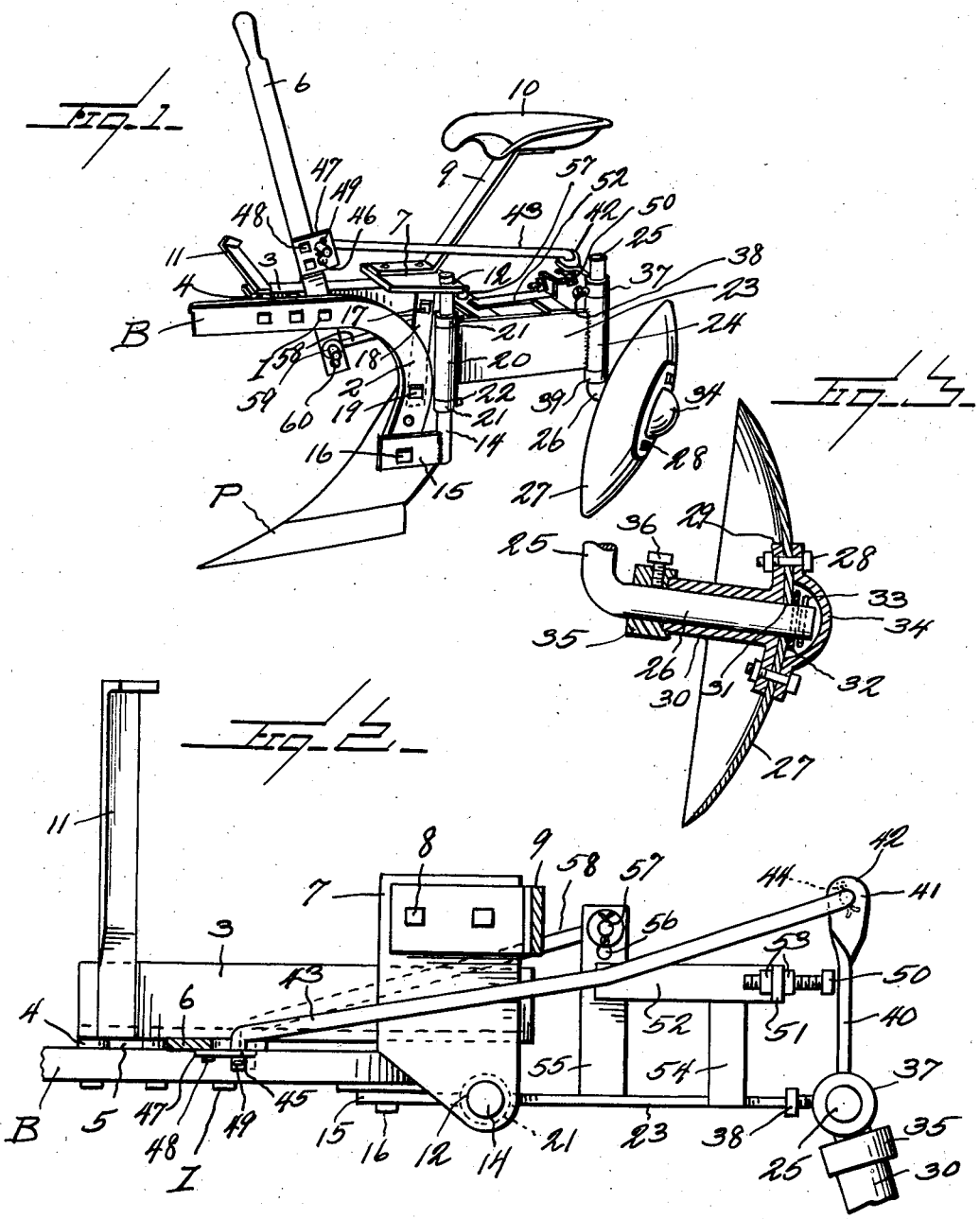

2,287,527

UNITED STATES PATENT OFFICE 2,287,527

ROOT TRIMMING PLOW

Mathias J. Lentsch, Silverton, Oreg.

Application March 8, 1941, Serial No. 382,438

6 Claims. (Cl. 97—129)

This invention relates to a root trimming plow and it is an object of the invention to provide a device of this kind which is particularly adapted for use in the trimming of roots in hopyards, vineyards, orchards and the like.

Another object of the invention is to provide a device of this kind which can be readily attached to and employed in connection with a standard tractor plow, and wherein the device is so constructed as to eliminate the necessity of hand trimming and also eliminating the necessity of cross-plowing.

The invention consists in the details of construction and in the combination and arrangement of the several parts of my improved root trimming plow whereby certain important advantages are attained, as will be hereinafter more fully set forth.

In order that my invention may be the better understood, I will now proceed to describe the same with reference to the accompanying drawing, wherein:

Figure 1 is a view in perspective illustrating a root trimming plow constructed in accordance with an embodiment of my invention and in applied position;

Figure 2 is a view in top plan of the structure as illustrated in Figure 1 with the seat omitted; and Figure 3 is a detailed view, partly in section and partly in elevation, illustrating the mounting of the trimming disk as herein embodied.

As disclosed in the accompanying drawing, B denotes a conventional type of plow beam such as used in connection with a tractor plow. This beam B carries the usual plow P.

Bolted, as at 1, or otherwise securely anchored to the rear portion of the beam B above the standard 2 thereof is the forward end portion of an extension beam 3. This beam, as herein disclosed, constitutes an angle iron of desired dimensions and extends rearwardly of the standard 2. The bolts 1 have mounted thereon and positioned between the beam B and the forward portion of the extension beam 3 the spacer washers 4 to provide a space 5 through which is freely directed the lower portion of a vertically disposed lever 6. This lever 6, at a desired point intermediate of its ends, is pivotally mounted upon one of the bolts 1, preferably the rearwardmost bolt. Welded or otherwise rigidly secured upon the rear portion of the extension beam 3 is the transversely disposed plate 7, this plate 7 being of a length to extend a material distance beyond opposite sides of the extension beam 3 and beyond one side of the beam B. The extended portion of the plate 7 remote from the beam B has bolted, as at 8, or otherwise securely anchored thereto the lower end portion of a conventional seat spring 9 carrying the usual seat 10. The forward portion of the extension beam 3 also has welded or otherwise securely connected thereon an end portion of the laterally disposed elongated and relatively narrow foot rest 11.

The end portion of the plate 7 extending beyond the beam B and its standard 2 is provided therethrough with the opening 12 through which extends from below the upper end portion of an elongated pivot shaft 14. The lower end portion of this shaft 14 has welded or otherwise fixedly carried thereby the perpendicularly related bar 15 of such length as to overlie the upper back portion of the plow P and bolted thereto, as at 16, or otherwise detachably fastened. This bar 15 is of such length and the attachment 16 so associated therewith to assure the pivot shaft 14 being maintained in a vertical position or in a position at right angles to the extension beam 3.

The rear portion of the extension beam 3 has bolted, as at 17, or otherwise secured thereto the upper end portion of a brace bar 18. The lower portion of this bar 18 is bolted, as at 19, or otherwise secured to the standard 2 of the beam B. The applied bar 18 serves to brace the beam 3 against the load imposed on the seat 10 when occupied.

Freely surrounding the pivot shaft 14 is an elongated sleeve 20 and this sleeve 20 is maintained in desired selected position along the pivot shaft 14 by the holding collars 21. These collars 21 are mounted upon the pivot shaft 14 above and below the sleeve 20 and are locked thereto by the binding screws 22. These collars 21 can be readily released when it is desired to change the location of the sleeve 20 and it is believed to be obvious that these collars 21 maintain the sleeve 20 in desired position by having direct contact with the opposite ends of the sleeve 20.

Radiating from the sleeve 20 is the rearwardly disposed elongated beam plate 23, this plate being straight and having its flat faces vertically disposed or disposed in the same general direction as the pivot shaft 14. The outer end portion of this beam plate 23 carries the vertically directed sleeve 24 disposed transversely of the flat faces of the beam plate 23, and freely disposed from below through the sleeve 24 is an elongated shaft 25. This shaft 25 is of predetermined length and is provided at its lower portion with the laterally disposed axle 26 upon which is rotatably mounted the trimmer disk 27. This disk 27 is concavo-convex and has bolted, as at 28, to its convex side and at its central portion a flange 29 welded or otherwise secured to the outer end of a bearing sleeve 30 rotatably mounted on the axle 26. The bore of the sleeve 30 registers with a central opening 31 of the disk 27 and through which opening 31 the outer end portion of the axle 26 is directed. The axle 26, outwardly of the trimmer disk, has mounted thereon a holding washer 32 retained in position by a cotter pin 33 inserted through the axle 26 outwardly of the applied washer 32.

The bolts 28 hereinbefore referred to also serve to maintain in applied position a dust cap 34 which houses the extended portion of the axle 26.

Co-acting with the inner extremity of the bearing sleeve 30 is a dust collar 35 freely surrounding the inner portion of the axle 26 but locked in desired effective position upon the axle 26 by the set screw 36.

Freely mounted upon the shaft 25 above the sleeve 24 is a collar 37 locked to the shaft 25 by a set screw 38 and in a position to contact from above with the sleeve 24. The lower portion of the sleeve 24 contacts with a thrust member 39 positioned upon the shaft 25 adjacent to the axle 26.

Carried by and extending radially from the collar 37 is an elongated bar 40 provided at its outer extremity with an eye 41 through which is freely directed from above a lug 42 depending from an end portion of an elongated operating rod 43. The lug 42 below the eye 41 has disposed therethrough a retaining cotter pin 44.

The extremity of the rod 43 remote from the bar 40 is provided with a laterally directed lug 45 which is selectively disposed through one of the spaced openings 46 provided in a rearwardly extended portion of a plate 47 bolted, as at 48, or otherwise rigidly secured to the lever 6 at a desired point above the pivotal mounting of the lever 6. The lug 45 extending beyond the plate 47 has disposed therethrough a retaining cotter pin 49.

Upon operation of the lever 6 the rod 43 and the bar 40 co-act to rotate the shaft 25 as desired to effect a trimming of the roots, as is often required when cultivating a hopyard, vineyard, orchard and the like, it being understood of course that during such operation the plow P is in forward motion in order that the disk 27 may be moved laterally in and out of its furrow.

The extent of swinging movement of the bar 40 in one direction is limited by contact of this bar 40 with a stop screw 50 threading through an upstanding lug 51 carried by a bar 52. The stop screw 50 is maintained in desired endwise adjustment through the conventional lock nuts 53 threading on the stop screw 50 and coacting with opposite faces of the lug 51.

The bar 52 is spaced from the beam plate 23 and is positioned to one side thereof and at the same side in which the bar 40 is directed. This bar 52 is held in its position by the bracket arms 54 and 55 suitably secured to the beam plate 23 at points spaced lengthwise thereof. The forward bracket arm 55 is of a length to extend beyond the bar 52 and the extended portion of this arm 55 has selectively inserted from below through one of the longitudinally spaced openings 56 an upstanding lug 57 carried by an extremity of the rod 58. This rod 58 extends forwardly and is provided at its front extremity with a laterally directed lug 59 which is selectively inserted through one of the spaced openings 60 provided in the lever 6 below its pivotal mounting.

It is believed to be obvious that upon swinging of the lever 6 in either of its directions, the rods 43 and 58 will have endwise movement in opposite directions, the rod 58 effecting a swinging movement of the beam plate 23 and the rod 43 effecting a turning movement of the shaft 25.

It is believed to be apparent from the foregoing that my improved root trimming plow is one whereby the trimming disk 27 can be readily moved into cutting position and returned to its resting position behind and following in the wake of the plow P, and wherein the roots can be trimmed with the elimination of hand trimming. It is also believed to be apparent that my improved trimming plow can be used in a manner to eliminate the necessity of cross-plowing.

In operation the plow P is in constant forward motion and cutting its own regular furrow during the movement of the lever 6 and consequent movement of the disk 27 from its straight forward line of travel. By proper operation of the lever 6 a neat semi-circular cut may be effected around the roots of a plant or hill, and then the disk 27 can readily be moved into position to cut an extra furrow between the plants or hills.

From the foregoing description it is thought to be obvious that a root trimming plow constructed in accordance with my invention is particularly well adapted for use by reason of the convenience and facility with which it may be assembled and operated.

I claim:

1. In combination with a plow structure, a root trimming plow comprising a beam plate, means for pivotally mounting said beam plate to the rear portion of the plow structure for swinging movement in a direction laterally of the path of travel of the plow structure, means carried by the plow structure and operatively connected with the beam plate for laterally swinging the beam plate, a shaft rotatably carried by the beam plate and disposed in a vertical direction, a trimming disk carried by the lower portion of the shaft and means for rotating the shaft.

2. In combination with a ground working implement, a root trimming plow comprising a beam plate, means for pivotally connecting said plate beam with the ground working implement, a shaft rotatably supported by the beam plate and disposed in a vertical direction, a root trimming disk carried by the lower portion of the shaft and means carried by the ground working implement and operatively connected with the plate beam and the shaft for simultaneously swinging the beam plate and rotating the shaft.

3. A root trimming plow comprising a beam plate, means for pivotally mounting said beam plate to the rear portion of a plow structure for swinging movement in a direction laterally of the path of travel of the plow structure, means for laterally swinging the beam plate, a shaft rotatably carried by the beam plate and disposed in a vertical direction, a trimming disk carried by the lower portion of the shaft, means for rotating the shaft, and means carried by the beam plate at one side thereof for limiting the turning movement of the shaft in one direction.

4. In combination with the beam of a plow, an extension beam secured to the plow beam and extending rearwardly thereof, a plate carried by the extension beam and extending laterally to one side thereof, a pivot shaft having one end portion disposed through the extended portion of the plate, means for securing the lower portion of said pivot shaft to the beam, a sleeve freely mounted on the pivot shaft, means for holding said sleeve in selected position on the pivot shaft, a beam plate extending outwardly from the sleeve, a vertically disposed shaft rotatably carried by the beam plate, a root trimming disk carried by the lower portion of the shaft and means for swinging the beam plate and for rotating the shaft.

5. In combination with the beam of a plow, an extension beam secured to the plow beam and extending rearwardly thereof, a plate carried by the extension beam and extending laterally to one side thereof, a pivot shaft having one end portion disposed through the extended portion of the plate, means for securing the lower portion of said pivot shaft to the beam, a sleeve freely mounted on the pivot shaft, means for holding said sleeve in selected position on the pivot shaft, a beam plate extending outwardly from the sleeve, a vertically disposed shaft rotatably carried by the beam plate, a root trimming disk carried by the lower portion of the shaft, means for swinging the beam plate and for rotating the shaft, and a seat structure mounted on the plate.

6. In combination with the beam of a plow, an extension beam secured to the plow beam and extending rearwardly thereof, a plate carried by the extension beam and extending laterally to one side thereof, a pivot shaft having one end portion disposed through the extended portion of the plate, means for securing the lower portion of said pivot shaft to the beam, a sleeve freely mounted on the pivot shaft, means for holding said sleeve in selected position on the pivot shaft, a beam plate extending outwardly from the sleeve, a vertically disposed shaft rotatably carried by the beam plate, a root trimming disk carried by the lower portion of the shaft, means for swinging the beam plate and for rotating the shaft, a seat structure mounted on the plate, and a foot rest carried by and extending laterally from the extension beam.

MATHIAS J. LENTSCH.